United States Patent [19]

Randall et al.

[11] Patent Number: 5,152,502

[45] Date of Patent: Oct. 6, 1992

[54] BALL VALVE SUBASSEMBLY, AND MEANS FOR UNITIZING SUCH INTO AN INTEGRATED ASSEMBLY

[75] Inventors: Richard D. Randall, York; Richard H. Forscht, Hellam; Thomas E. Kampel, Mechanicsburg, all of Pa.

[73] Assignee: ITT Corporation, New York, N.Y.

[21] Appl. No.: 822,334

[22] Filed: Jan. 17, 1992

[51] Int. Cl.⁵ .............................................. F16K 5/06
[52] U.S. Cl. .................................. 251/315; 137/454.2
[58] Field of Search .................... 251/315; 137/454.2, 137/454.6

[56] References Cited

U.S. PATENT DOCUMENTS

| | | |
|---|---|---|
| 3,095,898 | 7/1963 | Freeman et al. ................. 137/454.2 |
| 3,150,681 | 9/1964 | Hansen et al. .................. 137/454.2 |
| 4,587,990 | 5/1986 | Pennell et al. .................. 137/454.2 |

*Primary Examiner*—John C. Fox
*Attorney, Agent, or Firm*—Menotti J. Lombardi

[57] ABSTRACT

The subassembly is an integrated unit in which the operating internals of the ball valve are coupled to, and removable with, the ball valve cover. A flexible, U-shaped band, removably fastened to the cover, holds seat rings captive therein, and positions the rings at opposite, axial sides of the valve ball.

7 Claims, 2 Drawing Sheets

BALL VALVE SUBASSEMBLY, AND MEANS FOR UNITIZING SUCH INTO AN INTEGRATED ASSEMBLY

This invention pertains to ball valves, and in particular to ball valve subassemblies, i.e., the operative components within ball valve housings, and to means for unitizing such operative components of ball valves into integrated assemblies.

BACKGROUND OF THE INVENTION

Typical ball valves comprise valve housings with a cover having a stem, the stem being received in an apertured ball, and the ball interposed between seat rings. The aforesaid components, seat rings and ball, set within recesses provided therefor in the housing. Too, a compression spring is emplaced about the stem, and in between the cover and the ball, and a gasket is interposed between the cover and the housing.

Some fair degree of manual dexterity is required to assemble the ball valve components within a ball valve housing. Also, it will occur that personnel sent to service such valves wear bulky protective garments and gloves, and such limit an ability to handle separate ball valve parts and components with any facility. It would be of significant advantage to have the internal, operating components of a ball valve unitized into an integrated assembly, to simplify maintenance and servicing of the valve. Particularly, it would be beneficial to be able to remove all the internal, operating components of the ball valve with the cover when it is removed, such components being an integrated unit. This can be of importance in those valve applications involving radiation or toxic media, in which the valve must be serviced by remote, manipulation devices. Remote devices can detach a cover from a housing, with some facility, albeit not separate, internal parts; consequently the benefit of having all internal, operating components unitized and removable with the cover is self-evident.

SUMMARY OF THE INVENTION

It is an object of this invention to set forth a ball valve subassembly which obviates any need for particular manual dexterity in servicing ball valves, and means for unitizing ball valve subassembly components into an integrated assembly.

Particularly, it is an object of this invention to disclose a ball valve subassembly comprising a valve cover; seat rings; an apertured ball interposed between said rings; and means, removably coupled to said cover, unitizing said rings, ball and cover into an integrated assembly.

It is also an object of this invention to set forth, for use with a ball valve subassembly which has a valve cover, seat rings, and an apertured ball interposed between said rings, means for unitizing said rings, ball and cover into an integrated assembly, comprising a U-shaped band; wherein terminal ends of said band have means for fastening thereof to the valve cover; and said band comprises means for constraining said rings, sealingly, against said ball, while holding said rings captive.

Further objects of this invention, as well as the novel features thereof, will become apparent by reference to the following description taken in conjunction with the accompanying figures.

DESCRIPTION OF THE PREFERRED EMBODIMENT

Figure 1:
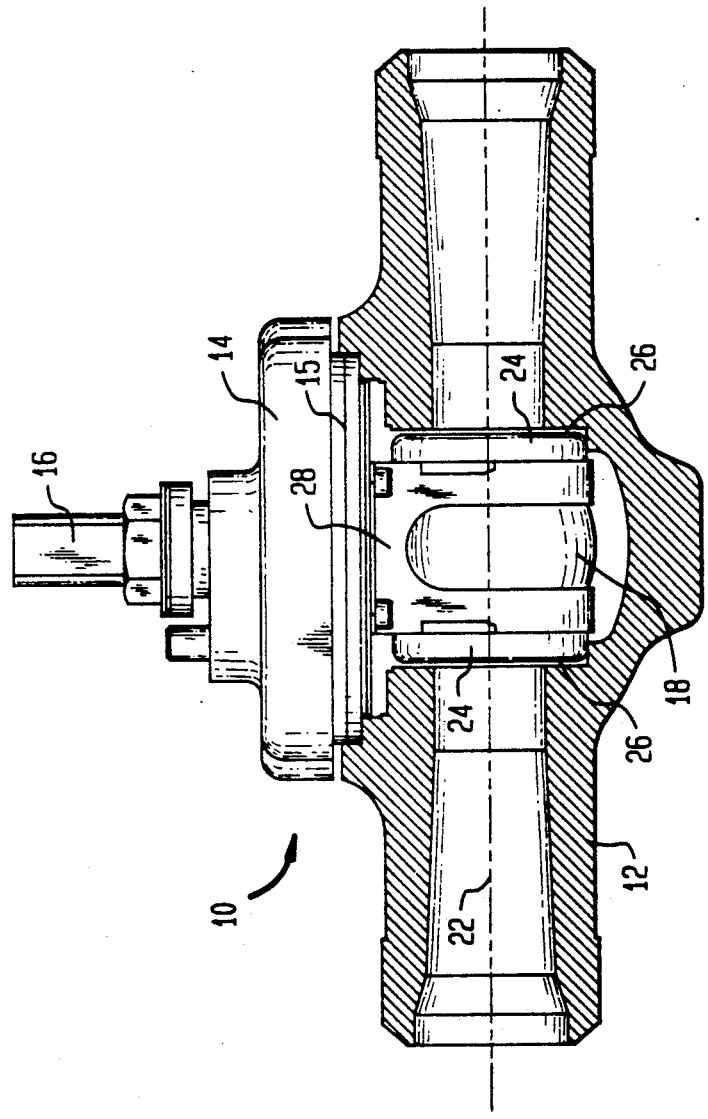
FIG. 1 is a side elevational view of a ball valve in which an embodiment of the invention is incorporated, the valve housing being shown in cross-section, and the ball valve subassembly being shown in full line illustration.

As shown in FIG. 1, a ball valve 10, of the top entry type, comprises a valve housing 12 with a cover 14 which is secured to the housing (by fasteners, not shown). The cover 14 has (a) a gasket 15, which is held in a circumferential groove provided therefore in the cover 14, and (b) has a throughgoing stem 16 which is keyingly received in a hole in a ball 18, in order that the ball can be rotated due to a rotation of the stem 16. The ball 18 has a throughgoing aperture 20, along an axis 22 thereof, and is nested between a pair of seat rings 24. The seat rings 24 are received, snugly, in seating recesses 26 formed therefor in the housing 12.

Figure 3:
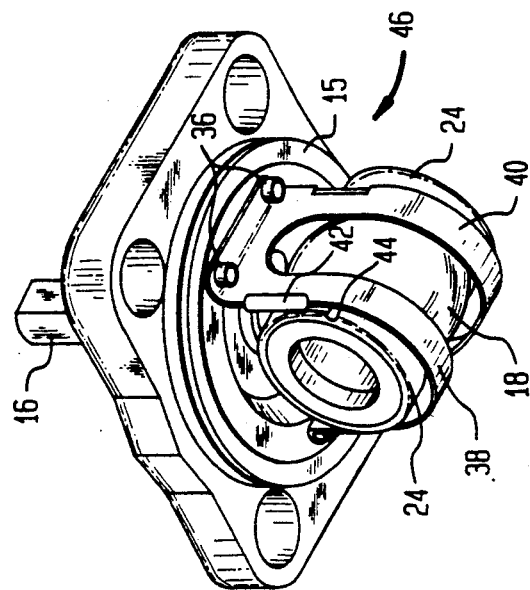
FIG. 3 is a perspective illustration of the inventive ball valve subassembly of FIG. 2 in assembled, operative disposition.
Figure 2:
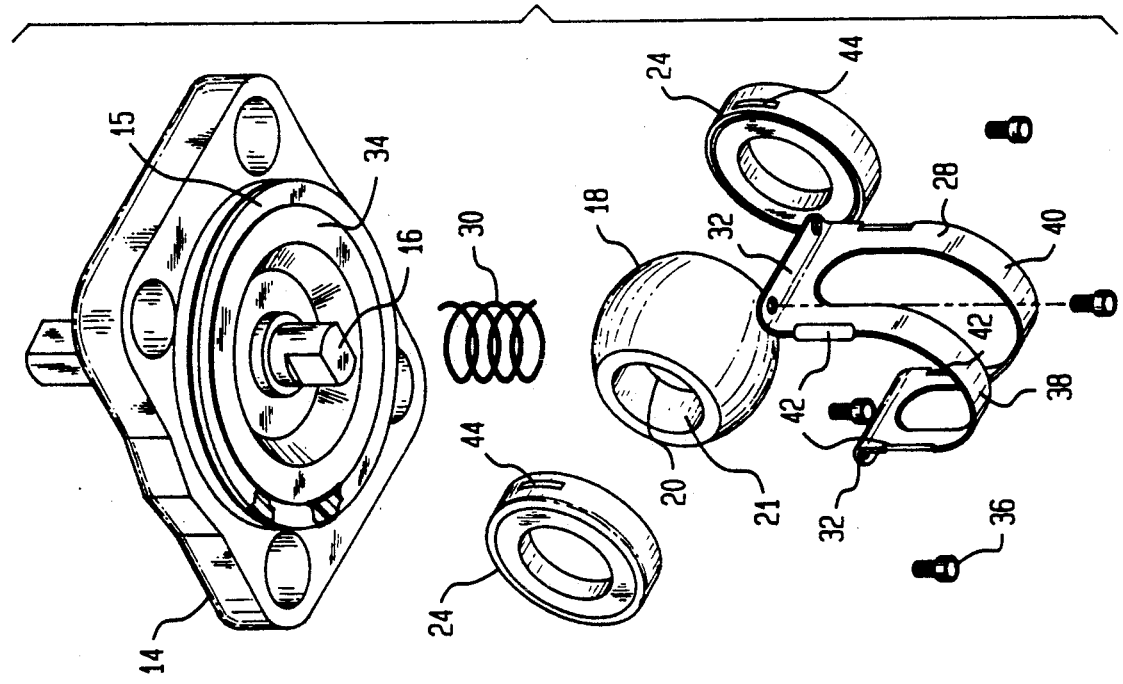
FIG. 2 is a perspective, exploded view of the novel ball valve subassembly, according to the FIG. 1 embodiment thereof.

FIGS. 2 and 3 show a novel band 28 which is used to unitize the rings 24 and the ball 18 into an integrated assembly with the cover 14 so that, when the cover 14 is unfastened from the housing 12, it has the band 28, rings 24 and ball 18 assembled thereto, along with a ball-biasing compression spring 30.

The band 28, of U-shape, has right-angular, footed ends 32 for fastening thereof to an inner surface 34 of the cover 14, ends 32 having fastener holes formed therein for receiving the fasteners 36. Surface 34 is drilled and tapped for reception of the fasteners 36. The band 28 has a pair of parallel straps 38 and 40. Each of the straps 38 and 40 has a pair of inturned, mutually confronting tabs 42, the same formed in the outermost ends of the band 28. The rings 24 have pairs of slots 44 formed in outer surfaces thereof, for slidable engagement with the tabs 42, whereby the rings 24 are held captive in the straps 38 and 40.

The novel ball valve subassembly 46 is assembled with the ball 18 in the valve open position (as shown in FIGS. 2 and 3). The seat rings 24 are set tightly against the opposite ends of the ball axis 22, and pushed down into the band 28 so that the slots 44 in the opposite sides of the rings 24 come into slidable engagement with the tabs 42. The spring 30 is set about the stem 16, and the footed ends 32 are secured to the cover inner surface 34 with the fasteners 36. With the subassembly 46 set into the housing 12, in the valve open position, there obtains a clearance between the seat rings 24 and the recesses 26. However, when the valve stem 16 is rotated ninety degrees of arc, to close the valve 10, the ball effects a camming action on the seat rings 24. This camming action proceeds from the provisioning of chamfers 21 about the outer surfaces or rims of the aperture 20 in the ball 18. In the open position, the seat rings 24 are held fast against the chamfers 21. As the ball 18 is rotated ninety degrees of arc, to closure, the spherical ball surfaces compress the seat rings. In this, the ball 18 pushes the rings 24 outwardly, along the axis 22, compressing the rings 24 between the ball 18 and the recesses 26, resulting in an efficient sealing off of the valve 10.

The band, in this embodiment of the invention, is formed of flexible, stainless steel. Consequently it can respond to compression of the seat rings, flexing therewith as necessary, with the valve in the closed and sealed off position. Yet, when the valve 10 is returned to a valve open position, the flexed band 28 returns to its quiescent attitude, i.e., with the aforesaid clearance between the seat rings 24 and the recesses 26. Removal of the entire, integrated subassembly 46, then, from the housing 12 is easily done.

It should be noted that, due to the slots 44 in the rings 24, and the tabs 42 on the straps 38 and 40, the rings 24 are free to move up and down, relative to the axis 22, albeit held captive by the tab 42-to-slot-44 arrangement. Thus, the rings are able to self-locate, in an optimum and correct seating thereof in the recesses 26, by sliding along the tabs 42.

While we have described the invention in connection with a specific embodiment thereof, it is to be clearly understood that this is done only by way of example, and not as a limitation to the scope of the invention, as set forth in the objects thereof and in the appended claims.

We claim:

1. A ball valve subassembly comprising:
   a valve cover;
   seat rings;
   an apertured ball interposed between said rings;
   means, removably coupled to said cover, unitizing said rings, ball and cover into an integrated assembly;
   said unitizing means comprises a U-shaped band; terminal ends of said band are fastened to said cover;
   said band comprises a pair of parallel straps; and each strap has means for holding one of said rings captive.

2. A ball valve assembly, according to claim 1, wherein:
   said straps and rings have mutually engageable means for holding each ring captive, as aforesaid, in one of said straps.

3. A ball valve assembly, according to claim 1, wherein:
   said holding means comprises tabs extending from said straps; and
   each ring has a slot, formed in an outer surface thereof, for slidable engagement of said slots with said tabs.

4. For use with a ball valve subassembly which has a valve cover, seat rings, and an apertured ball interposed between said rings, means for unitizing said rings, ball and cover into an integrated assembly, comprising:
   a U-shaped band; wherein
   terminal ends of said band have means for fastening thereof to the valve cover; and
   said band comprises means for constraining said rings, sealingly, against said ball, while holding said rings captive.

5. The invention, according to claim 4, wherein:
   said band further comprises means for accommodating limited, slidable displacement of said rings, relative to said band, while holding said rings captive, as aforesaid.

6. The invention, according to claim 5, wherein:
   said band is formed of a pair of parallel straps; and each strap has means for holding one of said rings captive.

7. The invention, according to claim 6, wherein:
   said holding means comprises tabs extending from said straps; and
   each ring has a slot, formed in an outer surface thereof, for slidable engagement of said slots with said tabs.

* * * * *